United States Patent [19]

Mehl et al.

[11] 4,119,374
[45] Oct. 10, 1978

[54] REPROGRAPHIC APPARATUS AND METHOD

[75] Inventors: Wolfgang Mehl; Roland Monti, both of Geneva, Switzerland

[73] Assignee: Sublistatic Holding S.A., Spielhof, Switzerland

[21] Appl. No.: 733,725

[22] Filed: Oct. 19, 1976

[30] Foreign Application Priority Data

Oct. 24, 1975 [CH] Switzerland ............................ 13778

[51] Int. Cl.² ........................ G03B 27/32; G03B 27/70
[52] U.S. Cl. .......................................... 355/32; 355/66
[58] Field of Search .................... 355/4, 32, 66, 106, 355/11, 77; 352/142

[56] References Cited

U.S. PATENT DOCUMENTS

| 2,940,358 | 6/1960 | Rosenthal | 355/66 |
| 3,498,713 | 3/1970 | Schlegel et al. | 355/66 |
| 3,515,554 | 6/1970 | Robillard | 355/106 UX |
| 3,601,484 | 8/1971 | Dybvig et al. | 355/32 X |
| 3,792,924 | 2/1974 | Matsuda et al. | 355/11 X |
| 3,963,341 | 6/1976 | Tully | 355/4 |
| 3,982,833 | 9/1976 | Kolibas | 355/11 |

Primary Examiner—Donald A. Griffin
Attorney, Agent, or Firm—Burgess, Dinklage & Sprung

[57] ABSTRACT

A reprographic apparatus (and its use) including an optical system, comprising an objective lens, for forming on a surface an image of an original and a device for selectively enabling a right-way-round image or an inverted image of such original to be produced on such surface, the device comprising a prism and a mirror alternatively interposable in the light path of the optical system.

7 Claims, 1 Drawing Figure

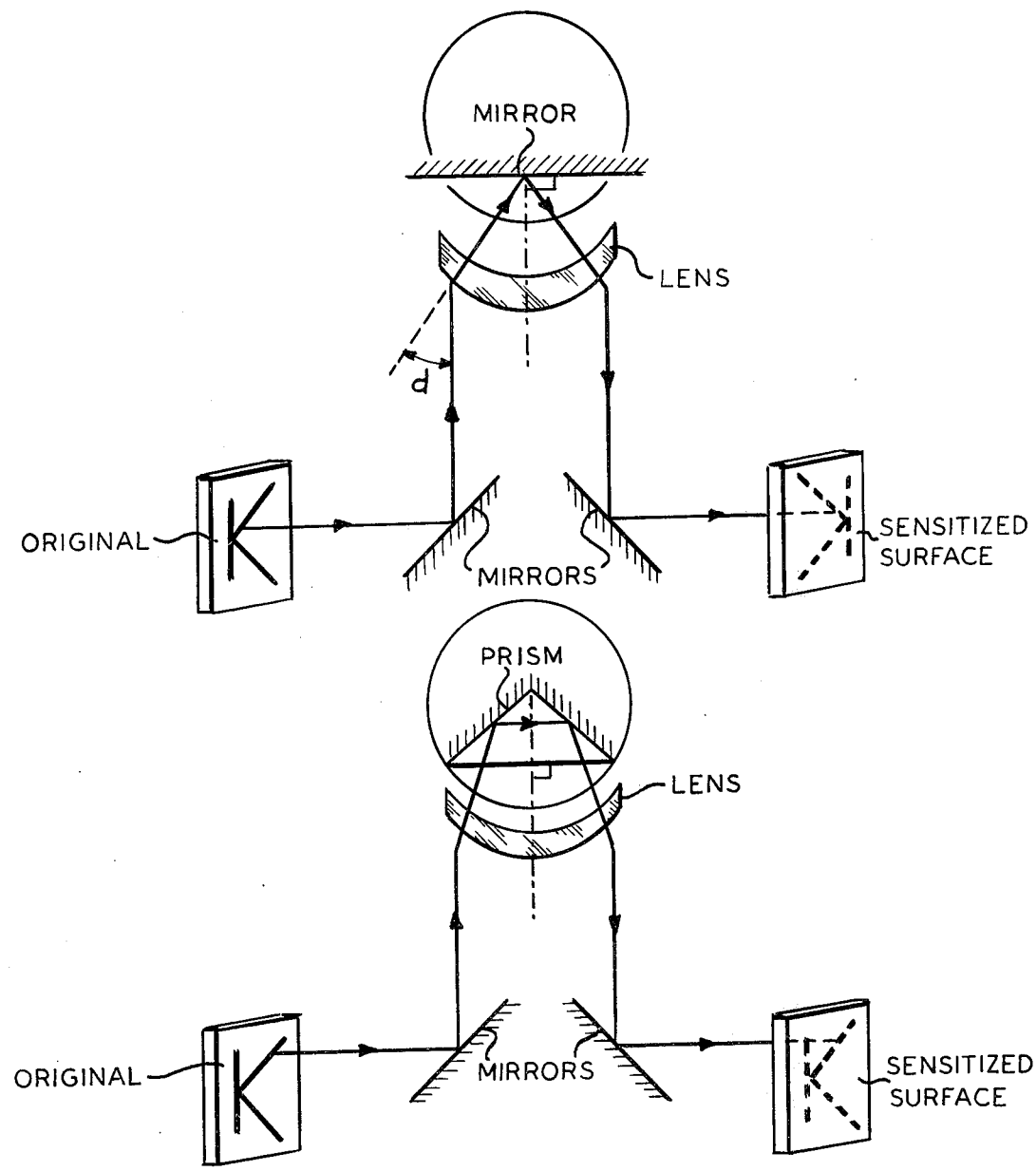

REPROGRAPHIC APPARATUS AND METHOD

The present invention relates to a reprographic apparatus and to a method of reprography.

Certain reproduction processes and reproduction machines make it possible to obtain a single-colour or multi-colour copy of an original, which copy can be transferred from an intermediate receiver onto a final receiver such as, for example, a textile article.

Thus, the electrophotographic process described in Swiss Application No. 212/74, employs particularly developers containing a ferromagnetic substance incorporated into polymer particles containing at least one sublimable or vaporisable dyestuff. A powder image is first obtained, generally onto a photoconductive layer, by developing the latent images with said developers. Thereafter, a pure dyestuff image is obtained, on the copy receiver by heating said powder image while in contact with this receiver and at a sufficiently high temperature for the dyestuffs present in the developers to vaporise or sublime in sufficient amounts. This is obviously carried out for the latent image corresponding to each of the various colour separations of the original until the image to be reproduced has been recomposed.

A colour reprography machine described in Swiss Application No. 1,533/75, corresponding to U.S. Pat. No. 4,017,176 comprises an exposure device and a carrier for the original, which are movable relative to one another, the exposure device comprising an objective constructed so as to concentrate the light reflected by the original onto a photosensitive surface. The scanning of the original is achieved as a result of a reciprocating movement of the exposure device relative to the original; this machine possesses simple and improved means for selecting the optical filter or filters which must be interposed in the path of the light beam during each scanning operation which is conducted for the reproduction of each colour separation of the original. This machine in general comprises a control device for selectively bringing into operation dispensers of developer products of different colours corresponding to the various colours separations of the original. These dispensers are movable between a storage position and a dispensing position, under which the printed photosensitive sheets pass successively. The control device thus preferably comprises a movable actuating bar which possesses a part located in the path of the device which is movable and actuates the said bar in a scanning movement.

Using the process or the machine described above, or a well known photocopying device which allows to obtain single-colored copies directly onto a photosensitive receiver such as a zinc oxide sheet and which is fitted with developers containing sublimable or vaporisable dyestuffs, the single-colored or multi-colored image obtained on the receiver can be further transferred, by heating to above the vaporisation or sublimation temperature of the dyestuffs present in the developers used, onto a final receiver, for example a textile article. Now, this transfer results in an inversion of the image which will be noticeable if the original does not have a vertical axis of symmetry.

According to the present invention there is provided a reprographic apparatus including an optical system, comprising an objective lens, for forming on a surface an image of an original and a device for selectively enabling a right-way-round image or an inverted image of such original to be produced on such surface, the device comprising a prism and a mirror alternatively interposable in the light path of the optical system.

The invention also provides a method of reprography comprising focussing on a surface an image of an original which is to be reproduced, selecting whether the image is to be inverted or the right-way-round with respect to the original and interposing either a mirror or a prism in the light path from the original to the image.

It is thus possible to modify the optics of the reprographic apparatus, so as to be able not only to reflect, but also to reflect or refract, as desired, the light image of the original through the objective lens of a camera, with the latter concentrating the light coming from a light source onto the sheet intended for the recording of this image. If one chooses to refract the light image instead of reflecting it, the image reproduced is inverted. When this inverted image is transferred onto a final receiver, the image obtained now corresponds to the original.

The mirror and prism are preferably selectively interposable in the path of the light image, after the latter has passed through the lenses of the objective of the exposure device of the reprographic apparatus, both the mirror or the prism can be interposed in the path of the light image, according to whether a right-way-round or inverted image, respectively, is desired; the mirror and prism are suitably placed in the objective and hence, if the reprographic machine is for colour reproductions, suitably in front of the filters which produce the colour separation.

The distances between the prism or the mirror and the lens of the objective are obviously preferably regulated in accordance with the optics of the latter such that the light beam transmitted is focussed at the same image plane onto the exposure surface, and more preferably such that light from a point on the original will be focussed on the same point on this surface regardless of whether the mirror or the prism is in the operating position. In fact, since the exposure surface is at a given distance from the exposure station, this avoids any other re-adjustment operation or manipulation when one interposes the mirror in the light path in place of the prism, or vice versa.

The mirror and the prism can, for example, be mounted on a plate or block which slides at right angles to the axis of the lens or lenses of the objective, the hypotenuse of the prism being opposite the lens or lenses of the objective. The prism must be positioned very precisely by means of a device which allows the sliding plate (or slide block) to stop opposite the lenses of the objective, precisely in the desired position, and to do so reproducibly. The movement of the sliding plate is preferably perfectly at right angles to the axis of the lenses, and the edge of the prism opposite its hypotenuse strictly perpendicular to the scanning direction.

The profile of the guide is generally so shaped as to avoid any play of the slide block.

The mirror can, for example, be held by straps. The prism is, for example, held in its seat by compression.

It is also possible to mount the mirror and the prism on a rotating member which successively brings one or other of these devices to a position opposite the lenses of the objective, by a pivoting movement. What has been stated above with regard to the position of the mirror or of the prism relative to the lenses of the objective continues to apply.

The assembly comprising the prism, mirror and slide block or plate can, for example, be actuated manually or by means of the scanning movement of the exposure station, or alternatively the selection of the mirror or of the prism can be programmed and controlled automatically.

Use of the prism and mirror makes it possible to operate the reprographic apparatus so as to obtain right-way-round or inverted copies of the original, by means of a very simple modification of the apparatus, without the addition of, for example, a second objective.

The drawing in this case represents a graphic presentation of the invention.

What we claim is:

1. A reprographic apparatus for color copying an original including an optical system, comprising an objective lens or lenses, for forming on a surface a light image of the original and a device for selectively enabling a right way-round image or an inverted image of such original to be produced on such surface, the device comprising a prism having an isosceles triangle cross section with the base thereof, which is adjacent to the two equal angles, positionable opposite the objective lens or lenses and a mirror having a flat reflective surface alternatively interposable in the light path after the latter has passed through the lens or lenses of the objective of the optical system, said base of the isosceles and the reflective surface of the mirror being positionable at right angles to the axis of the lens or lenses, both the mirror or the prism being interposed in the path of the light image, according to whether a right-way-round or inverted image, respectively, is desired, means for forming on said surface a latent image of said original and means for developing said latent image.

2. A reprographic apparatus according to claim 1, wherein the mirror and the prism are mounted on a plate which slides at right angles to the axis of the lens or lenses of the objective.

3. A reprographic apparatus according to claim 1, wherein the distances between the objective lens or lenses and the prism, when the prism is in operative position and between the objective lens or lenses and the mirror, when the mirror is in operative position, are such that an image of said origianl is focussed on the same point on said surface regardless of which one of the prism and the mirror is in the operative position.

4. A reprographic apparatus according to claim 1 when adapted to produce a colour image by forming colour separations of an original.

5. A reprographic apparatus according to claim 1 and having a single objective.

6. An apparatus according to claim 1, including means for heat-transferring the developed image to a textile article.

7. A reprographic apparatus according to claim 6, wherein the transferring means comprises means for heating the developed image and for enabling transfer of the image to take place by vaporisation or sublimation of a dye which forms at least part of the developed image.

* * * * *